United States Patent
Inui et al.

(10) Patent No.: US 6,245,307 B1
(45) Date of Patent: Jun. 12, 2001

(54) CATALYST FOR PURIFYING EXHAUST GAS FROM LEAN BURN ENGINE AND METHOD FOR PURIFICATION

(75) Inventors: Satoshi Inui; Masao Hori, both of Hyogo (JP); Kazuo Tsuchitani, Chatanooga, TN (US)

(73) Assignees: ICT Co., Ltd., Osaka-Fu (JP); International Catalyst Technology, Inc., Ridgefield Park, NJ (US)

( * ) Notice: Subject to any disclaimer, the term of this patent is extended or adjusted under 35 U.S.C. 154(b) by 0 days.

(21) Appl. No.: 09/241,751

(22) Filed: Feb. 1, 1999

Related U.S. Application Data (63) Continuation-in-part of application No. 08/806,114, filed on Feb. 25, 1997, now abandoned, which is a continuation of application No. 08/490,446, filed on Jun. 14, 1995, now abandoned.

(30) Foreign Application Priority Data

Jun. 17, 1994 (JP) .................................................. 6-136154

(51) Int. Cl.⁷ ................................ B01J 8/02; C01B 21/00
(52) U.S. Cl. ...................................... 423/231.5; 423/213.7
(58) Field of Search ............................... 423/213.5, 213.7

(56) References Cited

U.S. PATENT DOCUMENTS

| | | | |
|---|---|---|---|
| 5,179,059 | * | 1/1993 | Domesle .............................. 502/303 |
| 5,433,074 | * | 7/1995 | Seto .................................. 423/213.7 |
| 5,911,960 | * | 6/1999 | Miyoshi ............................. 423/213.5 |

FOREIGN PATENT DOCUMENTS 5-187229 * 7/1993 (JP) .

* cited by examiner

*Primary Examiner*—Steven P. Griffin
*Assistant Examiner*—Jonas N. Strickland
(74) *Attorney, Agent, or Firm*—Omri M. Behr (57) ABSTRACT

A catalyst for the purification of an exhaust gas emitting from a lean burn engine using gasoline as a fuel thereof and a method for the purification are provided. The catalyst has deposited on an inert carrier a mixture of a catalytically active component comprising palladium, an oxide of at least one alkali metal selected from the group consisting of potassium, sodium, rubidium, and cesium, and an oxide of at least one iron family metal selected from the group consisting of cobalt, nickel, and iron with a refractory inorganic oxide. This catalyst is used either alone or in combination with an oxidizing catalyst or a three-way catalyst for the purification of the exhaust gas from the lean burn engine using gasoline as a fuel thereof.

12 Claims, 1 Drawing Sheet

FIG. 1

CATALYST FOR PURIFYING EXHAUST GAS FROM LEAN BURN ENGINE AND METHOD FOR PURIFICATION

This application is a continuation-in-part of application Ser. No. 08/806,114, filed Feb. 25, 1997 now abandoned, which is a continuation of application Ser. No. 08/490,446, filed Jun. 14, 1995, now abandoned.

BACKGROUND OF THE INVENTION

1. Field of the Invention

This invention relates to a catalyst for purifying the exhaust gas from a lean burn engine using gasoline as a fuel and a method for the purification.

2. Description of the Related Art

In recent years, the exhaust gases emitting from internal combustion engines such as of automobiles, boilers, industrial plants, and others and containing such harmful components as nitrogen oxides (hereinafter occasionally referred to generally as "$NO_x$") have been forming a cause for air pollution. The removal of $NO_x$ from these exhaust gases, therefore, is now being studied from various angles.

In the case of the exhaust gas from an automobile, for example, the method which consists of treating the exhaust gas by the use of a three-way catalyst thereby simultaneously removing $NO_x$, hydrocarbons (HC) and carbon monoxide (CO) has been heretofore used. This method is implemented under the conditions which are capable of introducing such an amount of air as is necessary for complete combustion of the fuel (the ratio of the air to the fuel hereinafter referred to as "A/F ratio"). When the A/F ratio grows (this situation referred to hereinafter as "state of oxidizing atmosphere" or "lean state"), however, the oxygen is present in an excess of the amount necessary for complete combustion of such unburnt components in the exhaust gas as hydrocarbons and carbon monoxide. In this state of oxidizing atmosphere, it is difficult to effect removal of $NO_x$ by reduction with an ordinary three-way catalyst.

For the removal of nitrogen oxides in diesel engines among other internal combustion engines or in boilers, the method which resorts to use of a reducing agent such as ammonia, hydrogen, or carbon monoxide is prevalent. This method, however, is at a disadvantage in necessitating special devices for the recovery and disposal of the unaltered reducing agent.

The trend of the combustion devices toward higher fuel economy has been gaining in prominence owing to the problem of preservation of resources, the problem of the earth's warming due to the increase of carbon dioxide emitting from internal combustion engines, and others. The measures consequently taken to promote the fuel economy cause the exhaust gases to assume an increasingly lean state and the problem of $NO_x$ reduction to gain all the more in seriousness.

Recently, as a means to remove the $NO_x$, the methods which reside in using a $NO_x$-decomposing catalyst formed of a crystalline aluminosilicate containing copper ions have been disclosed (JP-A-60-125,250 and U.S. Pat. No. 4,297,328). These methods, as disclosed in these patent specifications, only go the length of decomposing nitrogen monoxide (NO) into nitrogen ($N_2$) and oxygen ($O_2$). They encounter difficulty, however, in permitting effective removal of nitrogen oxides under the actual conditions of the exhaust gas.

The crystalline aluminosilicate generally has no perfect resistance to heat and, therefore, exhibits no perfect durability when it is exposed for a long time to an exhaust gas at a temperature exceeding 700° C.

JP-A-63-100,919 has disclosed a method which consists in treating an exhaust gas with a copper-containing catalyst in an oxidizing atmosphere in the presence of a hydrocarbon thereby preferentially promoting the reaction of the $NO_x$ with the hydrocarbon and obtaining efficient removal of the $NO_2$. The hydrocarbon to be used for this method, as disclosed, may be either the hydrocarbon originally contained in the exhaust gas or the one to be added to the exhaust gas from an external source. As a specific mode of implementing this method, a procedure which comprises first exposing the exhaust gas to the copper-containing catalyst thereby removing the $NO_x$ and then exposing it to an oxidizing catalyst thereby removing the hydrocarbon, carbon monoxide, and others is also disclosed.

The catalyst mentioned above manifests inferior resistance to heat and, when exposed to an exhaust gas at an elevated temperature, suffers degradation of the $NO_x$-decomposing property thereof. To cope with these drawbacks, the method which resides in parallelly disposing the catalysts mentioned above and, when the exhaust gas is suffered to reach such an elevated temperature as mentioned above, causing the stream of the exhaust gas under treatment to be bypassed through the oxidizing catalyst or the three-way catalyst has been disclosed (JP-A-01-171,625).

As catalysts for the removal of nitrogen oxides which use precious metals, the catalyst which has platinum, for example, deposited in conjunction with an alkali metal or the like on a carrier of aluminum oxide (JP-A-49-21,379) and the catalyst which comprises activated alumina, platinum, and barium oxide (JP-A-55-67,334) have been disclosed. These catalysts are used under the condition that the exhaust gas under treatment should possess a low oxygen content (state of reducing atmosphere) or should be in the neighborhood of stoichiometry.

As a catalyst which is usable in the state of oxidizing atmosphere, the catalyst which has the components of platinum, rhodium, tungsten, and an alkali metal deposited on a carrier has been disclosed (JP-B-58-45,288). This state of oxidizing atmosphere has 1.4 for its Z number (equivalent to about 14.70 to 14.75 as reduced to the A/F ratio). Thus, this catalyst is substantially fit for use in the neighborhood of stoichiometry.

As catalysts which are usable in the state of oxidizing atmosphere, various catalysts using platinum as a main active component thereof have been disclosed (WO93/12863, WO93/07363, WO93/08383, JP-A-04-367,724, JP-A-05-168,860, JP-A-05-187,229, JP-A-05-261,287, JP-A-05-317,652, and JP-A-06-31,139). While the catalysts using platinum excel in terms of performance, the use of platinum proves unfavorable because platinum is so expensive as to boost the production cost of the catalysts. Besides, platinum offers no high resistance to heat and possibly proves imperfect from the viewpoint of durability. It is, therefore, necessary that the amount of platinum to be used in a catalyst be decreased or the use of platinum in a catalyst be avoided.

An object of this invention, therefore, is to provide a purifying catalyst for the removal of nitrogen oxides from an exhaust gas emitting from a lean burn engine using gasoline as a fuel and a method for the purification of the exhaust gas.

SUMMARY OF THE INVENTION

The object mentioned above is accomplished by a catalyst deposited on an inert carrier and adapted for the removal of nitrogen oxides from an exhaust gas emitting from a lean burn engine using gasoline as a fuel thereof, formed of a mixture of a catalytically active component consisting essentially of palladium, an oxide of at least one alkali metal selected from the group consisting of potassium, sodium, rubidium, and cesium, and an oxide of at least one iron family metal selected from the group consisting of cobalt, nickel, and iron with a refractory inorganic oxide, a mixture containing 0.5 to 10 g of palladium, 1 to 50 g of at least one alkali metal selected from the group consisting of potassium, sodium, rubidium, and cesium, 0.5 to 30 g of an oxide of at least one iron family metal selected from the group consisting of cobalt, nickel, and iron, and 50 to 400 g of the refractory inorganic oxide per liter of the catalyst.

The object mentioned above is further accomplished by a method for the purification of the exhaust gas from an automobile carrying a lean burn engine using gasoline as a fuel thereof, characterized by causing the exhaust gas from the automobile to contact a catalyst having deposited on an inert carrier a mixture of a catalytically active component consisting essentially of palladium, an oxide of at least one alkali metal selected from the group consisting of potassium, sodium, rubidium, and cesium, and an oxide of at least one iron family metal selected from the group consisting of cobalt, nickel, and iron with a refractory inorganic oxide and subsequently causing the exhaust gas to contact an oxidizing catalyst or a three-way catalyst.

The object mentioned above is further accomplished by a method for the purification of the exhaust gas from an automobile carrying a lean burn engine using gasoline as a fuel thereof, characterized by causing the exhaust gas from the automobile to contact a three-way catalyst or an oxidizing catalyst, subsequently causing the exhaust gas to contact a catalyst having deposited on an inert carrier a mixture of a catalytically active component consisting essentially of palladium, an oxide of at least one alkali metal selected from the group consisting of potassium, sodium, rubidium, and cesium, and an oxide of at least one iron family metal selected from the group consisting of cobalt, nickel, and iron with a refractory inorganic oxide, and further causing the exhaust gas to contact a three-way catalyst or an oxidizing catalyst.

When the catalyst according to this invention is used, substantial removal of NOx by reduction is attained easily even in a lean state having a large A/F ratio in spite of the presence of oxygen in an excess of the amount necessary for complete combustion of the unburnt component.

When this catalyst is used in combination with an oxidizing catalyst or a three-way catalyst, the complete combustion of the unburnt component can be attained with added infallibility.

DESCRIPTION OF THE PREFERRED EMBODIMENT

The catalyst of this invention for the purification of an exhaust gas is a product having deposited on an inert carrier a mixture of a catalytically active component consisting essentially of palladium, an oxide of at least one alkali metal selected from the group consisting of potassium, sodium, rubidium, and cesium, and an oxide of at least one iron family metal selected from the group consisting of cobalt, nickel, and iron with a refractory inorganic oxide.

To be specific, this invention has been perfected on the basis of a novel knowledge that the use of a catalyst which combines palladium as a main component thereof, generally held to be inferior to rhodium in the ability to reduce $NO_x$, an alkali metal, and an iron family metal permits the removal of $NO_x$ by reduction in the state of oxidizing atmosphere having a large A/F ratio, particularly an A/F ratio of 15 or more.

First, an amount of palladium to be used in this invention may be generally in the range of 0.5 to 10 g, preferably 0.7 to 8 g, per liter of the catalyst, though variable depending on the conditions of use. If the amount of palladium is less than 0.5 g/liter, the oxidizing activity of CO and THC (Total Hydrocarbons) will be lowered and the purifying activity of the catalyst manifested on the $NO_x$ will be consequently degraded. Conversely, if this amount exceeds 10 g/liter, the excess will not bring about any proportionate addition to the properties.

The amount of the alkali metal oxide may be generally in the range of 1 to 50 g, preferably 3 to 40 g, per liter of the catalyst, though variable depending on the conditions of use. If the amount of the alkali metal oxide is less than 1 g/liter, the oxidizing activity of palladium will not be fully repressed and the reaction of CO and THC will proceed preferentially and the purifying activity manifested on the $NO_x$ will be consequently degraded. Conversely, if this amount exceeds 50 g/liter, the oxidizing activity manifested by palladium will be repressed to an unduly large extent, the oxidizing activity of CO and THC will be lowered, and the purifying activity manifested on the $NO_x$ will be consequently degraded.

The amount of the oxide of the iron family metal to be used generally may be in the range of 0.5 to 30 g, preferably 1 to 25 g, per liter of the catalyst, though variable depending on the conditions of use. If the amount of the oxide of the iron family metal is less than 0.5 g/liter, the synergistic effect of palladium and the alkali metal will cease to be observed and the purifying activity manifested on the $NO_x$ will be inevitably lowered. Conversely, if this amount exceeds 30 g/liter, the oxidizing activity of palladium will be repressed to an unduly large extent, the oxidizing activity of CO and THC will be lowered, and the purifying activity manifested on the $NO_x$ will be consequently degraded. The combined use of cobalt and iron, among other iron family metals which are usable herein, produces the best results. Specifically, the combined use of cobalt and iron enhances the synergistic effect of palladium and the alkali metal and exalts the purifying activity manifested on the $NO_x$ both to the maximum extent. In this case, the amount of the oxide of cobalt may be advantageous in the range of 20 to 100 parts by weight, preferably 25 to 75 parts by weight, based on 100 parts by weight of the oxide of iron.

Incidentally, the $NO_x$ performance in the lean region which characterizes this invention can be obtained without using rhodium.

As typical examples of the refractory inorganic oxide, activated aluminas such as γ-alumina, δ-alumina, η-alumina, and θ-alumina, α-alumina, titania, and zirconia and complexes of such oxides such as, for example alumina-titania, alumina-zirconia, and titania-zirconia may be cited. Among other refractory inorganic oxides mentioned above, activated aluminas and zirconia prove particularly advantageous. The refractory inorganic oxide is generally in a powdery form and may have a Brunauer-Emmett-Teller (hereinafter referred to as "BET") surface area in the range of 10 to 400 $m^2/g$, preferably 50 to 300 $m^2/g$.

The amount of the refractory inorganic oxide to be used may be in the range of 50 to 400 g, preferably 80 to 350 g, per liter of the catalyst. If the amount is less than 50 g/liter, the catalyst will not fully acquire the expected quality. Conversely, if this amount exceeds 400 g/liter, the excess will not bring about a proportionate improvement in the quality and will possibly entrain the problem of increased back pressure.

The sources of palladium include nitrates, sulfates, chlorides, and other inorganic salts of palladium and ammine complex salts and other organic acid salts of palladium, for example.

The sources of alkali metal oxides include hydroxides, nitrates, carbonates, sulfates, phosphates, hydrochlorides, and other inorganic acid salts of alkali metals and acetates and other organic acid salts of alkali metals, for example.

The sources of iron family metal oxides include hydroxides, nitrates, carbonates, sulfates, phosphates, hydrochlorides, and other inorganic acid salts of iron family metals and acetates and other organic acid salts of iron family metals, for example.

Optionally, the catalytically active component mentioned above may additionally incorporate therein the oxide of at least one metal selected from the group consisting of cerium, lanthanum, and praseodymium. The amount of the oxide thus added optionally is in the range of 0.5 to 50 g, preferably 1 to 40 g, per liter of the catalyst. The incorporation of the metal oxide results in enhancing the purifying activity manifested on the $NO_x$ in the neighborhood of stoichiometry and, at the same time, exalting the durability of the catalyst.

Alternatively, another component may be incorporated into the aforementioned refractory inorganic oxide such as alumina for the purpose of improving the heat-resistance thereof. As examples of the additive for the improvement of the heat-resistance, alkali earth metals such as barium and strontium, rare earth elements such as lanthanum and neodymium, and zirconium, silicon and titanium may be cited.

The inert carrier to be effectively used in this invention is in the form of pellets or in the form of a monolith. For the sake of the catalyst, the monolith proves more advantageous than the pellets. The monolithic carrier is only required to be what is generally referred to as a ceramic honeycomb carrier. Particularly, honeycomb carriers using cordierite, mullite, α-alumina, zirconia, titania, titanium phosphate, aluminum titanate, betalite, spodumene, aluminosilicate, magnesium silicate, or the like as their materials are used advantageously. The honeycomb carriers using cordierites prove excellent among other honeycomb carriers mentioned above. Besides, monolythic structures using such oxidation-resistant and heat-resistant metals as stainless steel and Fe—Cr—Al alloy are usable.

The monolithic carrier is manufactured by the extrusion molding technique or the method of tightly rolling a sheet material, for example. The gas passages (cells) to be formed in the monolithic carrier may be in any of the shapes of hexagons, rectangles, triangles, or corrugations. The cell density (number of cells/unit cross section) may be in the range of 100 to 600 cells/square inch, preferably 200 to 500 cells/square inch, suffices for the intended use.

For the preparation of the catalyst of this invention, the following methods are available, for example. (1) A method which comprises collectively converting the catalytically active component and the refractory inorganic oxide into an aqueous slurry, coating a monolithic carrier with the aqueous slurry, then drying the wet coated carrier, and optionally calcining the dried coated carrier thereby obtaining a complete catalyst. (2) A method which comprises collectively converting such a palladium source as mentioned above and the refractory inorganic oxide into an aqueous slurry, coating a monolithic carrier with the aqueous slurry, then drying the wet coated carrier, optionally calcining the dried coated carrier, further immersing the carrier in aqueous solutions respectively of an alkali metal oxide source and an iron family metal oxide source sequentially (in an arbitrarily selected order) or an aqueous solution of the mixture of the two sources mentioned above, then drying the wet coated carrier, and further optionally calcining the dried coated carrier thereby obtaining a complete catalyst. (3) A method which comprises collectively converting an alkali metal oxide source, an iron family metal oxide source, and the refractory inorganic oxide into an aqueous slurry, coating a monolithic carrier with the aqueous slurry, then drying the coated carrier, optionally calcining the dried coated carrier, further immersing the carrier in the aqueous solution of a palladium source, then drying the coated carrier, and further optionally calcining the dried coated carrier thereby obtaining a complete catalyst. (4) A method which comprises thoroughly mixing the aqueous solution of a palladium source with the refractory inorganic oxide, then drying the resultant mixture, optionally calcining the dried mixture thereby obtaining a palladium-deposited refractory inorganic oxide powder, converting the powder into an aqueous slurry, coating a monolithic carrier with the aqueous slurry, then drying the wet coated carrier, optionally calcining the coated carrier, further immersing the calcined coated carrier in aqueous solutions respectively of an alkali metal oxide source and an iron family metal oxide source sequentially (in an arbitrarily selected order) or an aqueous solution of the mixture of the two sources mentioned above, then drying the wet coated carrier, and further optionally calcining the dried coated carrier thereby obtaining a complete catalyst. (5) A method which comprises thoroughly mixing the aqueous solution of an alkali metal oxide source, the aqueous solution of an iron family metal oxide source, and the refractory inorganic oxide, then drying the resultant mixture, optionally calcining the dried mixture thereby obtaining an alkali metal-deposited refractory inorganic oxide powder, converting this powder into an aqueous slurry, coating a monolithic carrier with the aqueous slurry, then drying the coated carrier, optionally calcining the dried coated carrier, further immersing the carrier in the aqueous solution of a palladium source, and further optionally calcining the dried coated carrier thereby obtaining a complete catalyst.

The conversion of the catalytic component, refractory inorganic oxide, palladium-carried refractory inorganic oxide, or the like mentioned above may be implemented by any of the well-known methods which are capable of producing an aqueous solution of such inorganic substances as mentioned above. Wet pulverization by the use of a ball mill, for example, is counted among these methods.

In consideration of the viscosity of a liquid prepared in the process of manufacture of a catalyst and the convenience of handling of the liquid, those of the well-known methods which cause the alkali metal oxide source to be added or deposited in the final stage of production of a complete catalyst prove particularly advantageous.

The carrier which has been coated with the catalytically active component and the refractory inorganic oxide is dried and then optionally calcined at a temperature in the range of 200 to 800° C., preferably 300 to 700° C., for a duration in the range of 1 to 10 hours, preferably 2 to 5 hours to produce a complete catalyst.

The catalyst which is obtained as described above is set in place in a converter and put to use for the purification of the exhaust gas emitting from a lean burn engine using gasoline as a fuel thereof. In this case, the A/F ratio in the lean state (state of oxidizing atmosphere) during the travel at a constant speed is not less than 15. It is held that in consideration of the fuel economy during the travel at the constant speed, this A/F rate ought to be not less than 18.

Specifically, the lean burn engine is so operated that the acceleration under a large load is mainly carried out at a theoretical A/F ratio in the neighborhood of 14.7 (hereinafter occasionally referred to as "stoichiometry") and the acceleration under a small load, idling, cruising, or the like is carried out under a lean state in which the amount of air is larger than that for the theoretical A/F ratio. The exhaust gas emitting from the lean burn engine, therefore, is such that the acceleration under a large load is in the neighborhood of stoichiometry and the acceleration under a small load, idling, cruising, or the like is in the lean state.

Figure 1:
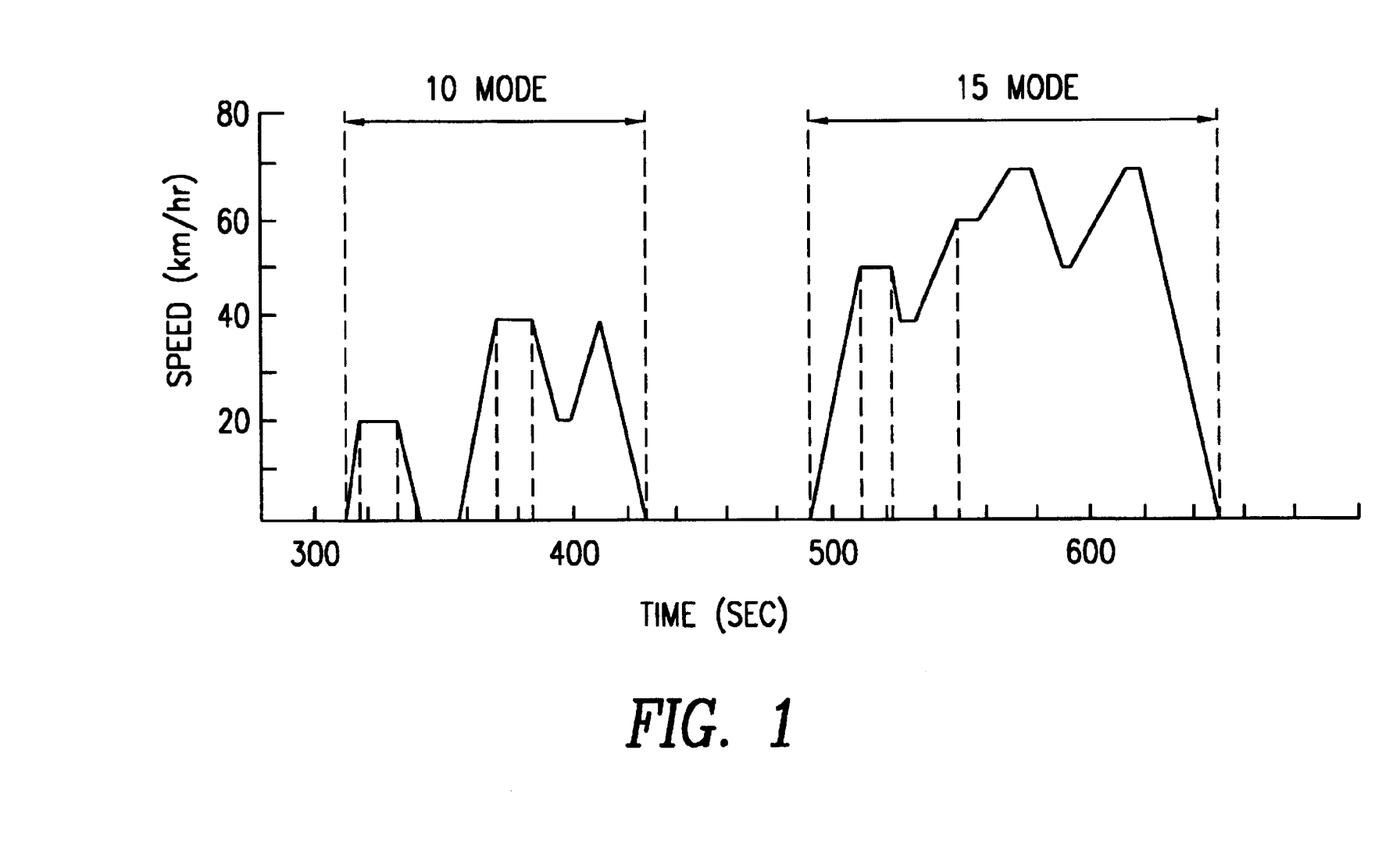
The FIGURE is a graph for explaining Mode 10.15 and shows a relationship between a speed and a time.

When the lean burn engine is mounted as in an automobile, the manner of operation of this engine repeatedly alternates between the stoichiometry and the lean, depending on the road condition, the traffic condition, or the like. The operating conditions for a lean burn engine of Mode 10.15 which takes into consideration of the road condition, the traffic condition, etc. prevalent in the territory of Japan, for example, are as shown in the FIGURE.

The catalyst of this invention, even by a test according to Mode 10.15, is found to exhibit an excellent purifying activity to the $NO_x$.

The catalyst according to this invention, when set in place in a converter and put to use for purifying the exhaust gas from a lean burn engine using gasoline as a fuel thereof as described above, manifests a fully satisfactory purifying activity to CO, HC, and $NO_x$. For use in an automobile which requires further removal of CO and HC, a system in which a second converter packed with an oxidizing catalyst is additionally used as disposed on the downstream side from the catalyst of this invention is recommended. A three-way catalyst may be used in place of the oxidizing catalyst. The catalytic component to be used for the oxidizing catalyst comprises a precious metal such as platinum and/or palladium and a refractory inorganic oxide such as alumina, titania, or silica. The oxidizing catalyst occasionally incorporates therein one or more members selected from the group consisting of rare earth element oxides such as lanthanum oxide ($La_2O_3$) and metals such as iron, cobalt, and nickel. The amount of the precious metal to be deposited may be advantageous in the range of 0.1 to 5 g and that of the refractory inorganic oxide in the range of 10 to 300 g respectively per liter of the catalyst. When the oxide of a rare earth element is incorporated, the amount thereof may be advantageous in the range of more than 0 and not more than 15 g per liter of the catalyst. If the amount of the precious metal is less than 0.1 g/liter, the purifying ability of the catalyst will be unduly low. If this amount exceeds 5 g/liter, the excess will bring about no proportionate increase in the effect of the catalyst. If the amount of the refractory inorganic oxide is less than 10 g/liter, the catalyst will betray deficiency in the ability to disperse the precious metal and others. If this amount exceeds 300 g/liter, the disadvantage arises that when the refractory inorganic oxide is deposited in a honeycomb carrier, for example, it will clog the honeycomb. When the refractory inorganic oxide is added in an amount exceeding 150 g/liter, the disadvantage follows that it will inevitably degrade the strength with which the catalytic component is carried. In the present invention, when a catalyst containing palladium, the oxide of at least one metal selected from the group consisting of potassium, sodium, rubidium, and cesium, the oxide of at least one iron family metal selected from the group consisting of cobalt, nickel, and iron, and a refractory inorganic oxide is disposed on the upstream side of the stream of the exhaust gas and an oxidizing catalyst is subsequently disposed, the decrease of the contents of CO, HC, or the like in the exhaust gas is attained to a greater extent than when the oxidizing catalyst is not disposed.

Generally, the catalytic components essential for the three-way catalyst mentioned above are a precious metal which is platinum plus rhodium, palladium plus rhodium, or platinum, palladium plus rhodium, a refractory inorganic oxide such as alumina, titania, or silica, and ceria. Optionally, the three-way catalyst may additionally incorporate therein the oxide of a rare earth element other than zirconia and cerium such as, for example, the oxide of a rare earth element like lanthanum oxide ($La_2O_3$,). The three-way catalyst is generally prepared by having the catalytic components deposited on what is generally used as a catalyst carrier such as, for example, a honeycomb. The amount of the precious metal to be carried may be advantageously in the range of 0.1 to 5 g, that of the refractory inorganic oxide such as alumina, titania, or silica in the range of 10 to 300 g, and that of ceria in the range of 10 to 150 g respectively per liter of the catalyst. The amount of the oxide of the rare earth element other than cerium may be advantageous in the range of more than 0 g and not more than 50 g per liter of the catalyst. If the amount of the precious metal is less than 0.1 g/liter, the purifying ability of the catalyst will be unduly low. If this amount exceeds 5 g/liter, the excess will hardly bring about a proportionate addition to the expected effect. If the amount of the refractory inorganic oxide to be added is less than 10 g/liter, the ability of the catalyst to disperse the precious metal and others. If this amount exceeds 300 g/liter, the disadvantage arises that when the refractory inorganic oxide is deposited in a honeycomb carrier, for example, it will clog the honeycomb. If the amount of ceria to be added is less than 10 g/liter, the effect of ceria on the operation of storing and releasing oxygen will not be fully satisfactorily manifested throughout the entire volume of the catalyst. If the amount exceeds 150 g/liter, the disadvantage follows that the excess will inevitably degrade the strength with which the catalytic components are carried. The addition of the oxide of a rare earth element other than cerium is intended to enhance the thermal stability of the refractory inorganic oxide. If this oxide is added in an amount exceeding 50 g/liter, there arises the disadvantage that the excess will inevitably degrade the strength with which the catalytic components are carried because the three-way catalyst has already deposited thereon a certain amount of ceria. The three-way catalyst removes the $NO_x$ under the condition of stoichiometry and cannot effect this removal under the condition of lean. In this invention, however, when a catalyst containing palladium, the oxide of at least one metal selected from the group consisting of potassium, sodium, rubidium, and cesium, the oxide of at least one iron family metal selected from the group consisting of cobalt, nickel, and iron, and a refractory inorganic oxide is disposed on the upstream side of the stream of the exhaust gas and an oxidizing catalyst is subsequently disposed, the decrease of the contents of CO, HC, or the like in the exhaust gas is attained to a greater extent than when the oxidizing catalyst is not disposed.

In an automobile of the type which requires to begin the removal of CO and HC at a low temperature, a system in which a third converter packed with an oxidizing catalyst is additionally used as disposed on the upstream side from the catalyst of this invention is recommended.

It is allowable to use a three-way catalyst in place of the oxidizing catalyst. In this invention, when the oxidizing catalyst or the three-way catalyst is disposed on the upstream side in the stream of the exhaust gas, a catalyst containing palladium, the oxide of at least one metal selected from the group consisting of potassium, sodium, rubidium, and cesium, the oxide of at least one iron family metal selected from the group consisting of cobalt, nickel, and iron, and a refractory inorganic oxide is disposed subsequently, and the oxidizing catalyst or the three-way catalyst is further disposed thereafter, the decrease of the contents of CO, HC, or the like in the exhaust gas can be commenced at a lower temperature than when the oxidizing catalyst or the three-way catalyst is not disposed on the upstream side.

As typical examples of the three-way catalyst answering the description given above, the following catalysts may be cited.

(a) A three-way catalyst having deposited on a monolithic carrier a mixture of a catalytically active component composed of 0.1 to 5 g of platinum plus palladium, 0.01 to 1 g of rhodium, and 10 to 150 g of the oxide of cerium with 20 to 200 g of activated alumina respectively per liter of the catalyst (JP-A-62-91,244).

(b) A three-way catalyst having deposited on a monolithic carrier 0.1 to 10 g of a precious metal, 1 to 150 g of an oxide of cerium, and 50 to 100 g of a refractory inorganic oxide per liter of the catalyst (JP-A-01-27,643).

Now, this invention will be described more specifically below with reference to working examples.

EXAMPLE 1

A powder was obtained by mixing 2 kg of activated alumina possessing a BET surface area of 120 m$^2$/g with a mixture of an aqueous palladium nitrate solution containing 30 g of palladium with an aqueous solution containing 181 g of cobalt nitrate [$Co(NO_3)_2 \cdot 6H_2O$], drying the resultant mixture at 120° C. for 2 hours, and calcining the dried mixture at 500° C. for 2 hours. This powder was wet pulverized by means of a ball mill to obtain an aqueous slurry. A commercially available cordierite honeycomb carrier (a product of NGK Insulators LTD. containing 400 gas flow cells per square inch of cross section and having a volume of 1.0 liter) was immersed in the aqueous slurry and the wet honeycomb carrier was blown with compressed air to expel the excess slurry. Then, the wet honeycomb carrier was dried at 120° C. for 2 hours and calcined at 500° C. for 2 hours to obtain a honeycomb carrier coated with the alumina powder carrying palladium and cobalt thereon. Further, the honeycomb carrier consequently obtained was immersed in an aqueous solution containing 2.6 mols of potassium nitrate per liter, then blown with compressed air to expel the surplus solution, dried at 120° C., and calcined at 500° C. to obtain a complete catalyst (1). This catalyst was found to have 3 g of palladium, 5 g of cobalt oxide, 10 g of potassium oxide, and 200 g of activated alumina deposited on the carrier per liter of the catalyst.

EXAMPLE 2

A complete catalyst (2) was obtained by following the procedure of example 1 while using an aqueous palladium nitrate solution containing 7 g of palladium in place of the aqueous palladium nitrate solution containing 30 g of palladium. This catalyst was found to have 0.7 g of palladium, 5 g of cobalt oxide, 10 g of potassium oxide, and 200 g of activated alumina deposited on the carrier per liter of the catalyst.

EXAMPLE 3

A complete catalyst (3) was obtained by following the procedure of Example 1 while using an aqueous palladium nitrate solution containing 80 g of palladium in place of the aqueous palladium nitrate solution containing 30 g of palladium. This catalyst was found to have 8 g of palladium, 5 g of cobalt oxide, 10 g of potassium oxide, and 200 g of activated alumina deposited on the carrier per liter of the catalyst.

EXAMPLE 4

A complete catalyst (4) was obtained by following the procedure of Example 1 while using an aqueous palladium nitrate solution containing 3 g of palladium in place of the aqueous palladium nitrate solution containing 30 g of palladium. This catalyst was found to have 0.3 g of palladium, 5 g of cobalt oxide, 10 g of potassium oxide, and 200 g of activated alumina deposited on the carrier per liter of the catalyst.

EXAMPLE 5

A complete catalyst (5) was obtained by following the procedure of Example 1 while using an aqueous palladium nitrate solution containing 150 g of palladium in place of the aqueous palladium nitrate solution containing 30 g of palladium. This catalyst was found to have 15 g of palladium, 5 g of cobalt oxide, 10 g of potassium oxide, and 200 g of activated alumina deposited on the carrier per liter of the catalyst.

EXAMPLE 6

A complete catalyst (6) was obtained by following the procedure of Example 1 while using an aqueous solution containing 0.77 mol of potassium nitrate per liter in place of the aqueous solution containing 2.6 mols of potassium nitrate per liter. This catalyst was found to have 3 g of palladium, 5 g of cobalt oxide, 3 g of potassium oxide, and 200 g of activated alumina deposited on the carrier per liter of the catalyst.

EXAMPLE 7

A complete catalyst (7) was obtained by following the procedure of Example 1 while using an aqueous solution containing 10.2 mols of potassium acetate per liter in place of the aqueous solution containing 2.6 mols of potassium nitrate per liter. This catalyst was found to have 3 g of palladium, 5 g of cobalt oxide, 40 g of potassium oxide, and 200 g of activated alumina deposited on the carrier per liter of the catalyst.

EXAMPLE 8

A complete catalyst (8) was obtained by following the procedure of Example 1 while using an aqueous solution containing 0.13 mol of potassium nitrate per liter in place of the aqueous solution containing 2.6 mols of potassium nitrate per liter. This catalyst was found to have 3 g of palladium, 5 g of cobalt oxide, 0.5 g of potassium oxide, and 200 g of activated alumina deposited on the carrier per liter of the catalyst.

EXAMPLE 9

A complete catalyst (9) was obtained by following the procedure of Example 1 while using an aqueous solution containing 15.3 mols of potassium nitrate per liter in place of the aqueous solution containing 2.6 mols of potassium nitrate per liter. This catalyst was found to have 3 g of palladium, 5 g of cobalt oxide, 60 g of potassium oxide, and 200 g of activated alumina deposited on the carrier per liter of the catalyst.

EXAMPLE 10

A complete catalyst (10) was obtained by following the procedure of Example 1 while using an aqueous solution containing 4.3 mols of sodium nitrate per liter in place of the aqueous solution containing 2.6 mols of potassium nitrate per liter. This catalyst was found to have 3 g of palladium, 5 g of cobalt oxide, 10 g of sodium oxide, and 200 g of activated alumina deposited on the carrier per liter of the catalyst.

EXAMPLE 11

A complete catalyst (11) was obtained by following the procedure of Example 1 while using an aqueous solution containing 36.3 g of cobalt nitrate in place of the aqueous solution containing 181 g of cobalt nitrate. This catalyst was found to have 3 g of palladium, 1 g of cobalt oxide, 10 g of potassium oxide, and 200 g of activated alumina deposited on the carrier per liter of the catalyst.

EXAMPLE 12

A complete catalyst (12) was obtained by following the procedure of Example 1 while using an aqueous solution containing 906 g of cobalt nitrate in place of the aqueous solution containing 181 g of cobalt nitrate. This catalyst was found to have 3 g of palladium, 25 g of cobalt oxide, 10 g of potassium oxide, and 200 g of activated alumina deposited on the carrier per liter of the catalyst.

EXAMPLE 13

A complete catalyst (13) was obtained by following the procedure of Example 1 while using an aqueous solution containing 10.9 g of cobalt nitrate in place of the aqueous solution containing 181 g of cobalt nitrate. This catalyst was found to have 3 g of palladium, 0.3 g of cobalt oxide, 10 g of potassium oxide, and 200 g of activated alumina deposited on the carrier per liter of the catalyst.

EXAMPLE 14

A complete catalyst (14) was obtained by following the procedure of Example 1 while using an aqueous solution containing 1.45 kg of cobalt nitrate in place of the aqueous solution containing 181 g of cobalt nitrate. This catalyst was found to have 3 g of palladium, 40 g of cobalt oxide, 10 g of potassium oxide, and 200 g of activated alumina deposited on the carrier per liter of the catalyst.

EXAMPLE 15

A complete catalyst (15) was obtained by following the procedure of Example 1 while using 0.8 kg of activated alumina in place of 2 kg of the activated alumina. This catalyst was found to have 3 g of palladium, 5 g of cobalt oxide, 10 g of potassium oxide, and 80 g of activated alumina deposited on the carrier per liter of the catalyst.

EXAMPLE 16

A complete catalyst (16) was obtained by following the procedure of Example 1 while using 3.5 kg of activated alumina in place of 2 kg of the activated alumina. This catalyst was found to have 3 g of palladium, 5 g of cobalt oxide, 10 g of potassium oxide, and 350 g of activated alumina deposited on the carrier per liter of the catalyst.

EXAMPLE 17

A complete catalyst (17) was obtained by following the procedure of Example 1 while using 0.4 kg of activated alumina in place of 2 kg of the activated alumina. This catalyst was found to have 3 g of palladium, 5 g of cobalt oxide, 10 g of potassium oxide, and 40 g of activated alumina deposited on the carrier per liter of the catalyst.

EXAMPLE 18

A complete catalyst (18) was obtained by following the procedure of Example 1 while using 4.5 kg of activated alumina in place of 2 kg of the activated alumina. This catalyst was found to have 3 g of palladium, 5 g of cobalt oxide, 10 g of potassium oxide, and 450 g of activated alumina deposited on the carrier per liter of the catalyst.

EXAMPLE 19

A powder (A) was obtained by mixing 1.5 kg of the same activated alumina as used in Example 1 with a mixture consisting of an aqueous palladium nitrate solution containing 18 g of palladium and an aqueous solution containing 181 g of cobalt nitrate, drying the resultant mixture at 120° C. for 2 hours, and then calcining the dried mixture at 500° C. for 2 hours. A powder (B) was obtained by mixing 0.65 Kg of zirconia having a BET surface area of 80 $m^2/g$ with a mixture comprising an aqueous palladium nitrate solution containing 12 g of palladium and an aqueous cerium nitrate solution containing 100 g of cerium as cerium oxide, drying the resultant mixture at 120° C. for 2 hours, and then calcining the dried mixture at 500° C. for 2 hours. An aqueous slurry was obtained by wet pulverizing the powders (A) and (B) obtained as described above by the use of a ball mill. A complete catalyst (19) was obtained by following the procedure of Example 1. This catalyst was found to have 3 g of palladium, 5 g of cobalt oxide, 10 g of potassium oxide, 10 g of cerium oxide, 65 g of zirconia, and 150 g of activated alumina deposited on the carrier per liter of the catalyst.

EXAMPLE 20

A complete catalyst (20) was obtained by following the procedure of Example 19 while using an aqueous cerium nitrate solution containing 10 g of cerium as cerium oxide in place of the aqueous cerium nitrate solution containing 100 g of cerium as cerium oxide. This catalyst was found to have 3 g of palladium, 5 g of cobalt oxide, 10 g of potassium oxide, 1 g of cerium oxide, 65 g of zirconia, and 150 g of activated alumina deposited on the carrier per liter of the catalyst.

EXAMPLE 21

A complete catalyst (21) was obtained by following the procedure of Example 19 while using an aqueous cerium nitrate solution containing 400 g of cerium as cerium oxide in place of the aqueous cerium nitrate solution containing 100 g of cerium as cerium oxide. This catalyst was found to have 3 g of palladium, 5 g of cobalt oxide, 10 g of potassium oxide, 40 g of cerium oxide, 65 g of zirconia, and 150 g of activated alumina deposited on the carrier per liter of the catalyst.

EXAMPLE 22

A complete catalyst (22) was obtained by following the procedure of Example 19 while using an aqueous cerium nitrate solution containing 3 g of cerium as cerium oxide in place of the aqueous cerium nitrate solution containing 100 g of cerium as cerium oxide. This catalyst was found to have 3 g of palladium, 5 g of cobalt oxide, 10 g of potassium oxide, 0.3 g of cerium oxide, 65 g of zirconia, and 150 g of activated alumina deposited on the carrier per liter of the catalyst.

EXAMPLE 23

A complete catalyst (23) was obtained by following the procedure of Example 19 while using an aqueous cerium nitrate solution containing 700 g of cerium as cerium oxide in place of the aqueous cerium nitrate solution containing 100 g of cerium as cerium oxide. This catalyst was found to have 3 g of palladium, 5 g of cobalt oxide, 10 g of potassium oxide, 70 g of cerium oxide, 65 g of zirconia, and 150 g of activated alumina deposited on the carrier per liter of the catalyst.

EXAMPLE 24

A complete catalyst (24) was obtained by following the procedure of Example 19 while using an aqueous lanthanum nitrate solution containing 100 g of lanthanum as lanthanum oxide in place of the aqueous cerium nitrate solution containing 100 g of cerium as cerium oxide. This catalyst was found to have 3 g of palladium, 5 g of cobalt oxide, 10 g of potassium oxide, 10 g of lanthanum oxide, 65 g of zirconia, and 150 g of activated alumina deposited on the carrier per liter of the catalyst.

EXAMPLE 25

A complete catalyst (25) was obtained by following the procedure of Example 19 while using an aqueous praseodymium nitrate solution containing 100 g of praseodymium as praseodymium oxide in place of the aqueous cerium nitrate solution containing 100 g of cerium as cerium oxide. This catalyst was found to have 3 g of palladium, 5 g of cobalt oxide, 10 g of potassium oxide, 10 g of praseodymium oxide, 65 g of zirconia, and 150 g of activated alumina deposited on the carrier per liter of the catalyst.

EXAMPLE 26

A powder was obtained by mixing 2 kg of the same activated alumina as used in Example 1 with an aqueous palladium nitrate solution containing 30 g of palladium, drying the resultant mixture at 120° C. for two hours, and then calcining the dried mixture at 500° C. for two hours. This powder was processed in the same manner as in Example 1 to obtain a complete catalyst (26). This catalyst was found to have 3 g of palladium, 10 g of potassium oxide, and 200 g of activated alumina deposited on the carrier per liter of the catalyst.

EXAMPLE 27

A complete catalyst (27) was obtained by following the procedure of Example 1 while omitting the use of the aqueous solution containing 2.6 mols of potassium nitrate per liter. This catalyst was found to have 3 g of palladium, 5 g of cobalt oxide, and 200 g of activated alumina deposited on the carrier per liter of the catalyst.

EXAMPLE 28

A complete catalyst (28) was obtained by following the procedure of Example 1 while using an aqueous solution containing 253 g of ferric nitrate [$Fe(NO_3)_3 \cdot 9H_2O$] in place of the aqueous solution containing 181 g of cobalt nitrate solution. This catalyst was found to have 3 g of palladium, 5 g of iron oxide, 10 g of potassium oxide, and 200 g of activated alumina deposited on the carrier per liter of the catalyst.

EXAMPLE 29

A complete catalyst (29) was obtained by following the procedure of Example 1 while using an aqueous mixed solution containing 181g of cobalt nitrate and 506 g of ferric nitrate [$Fe(NO_3)_3 \cdot 9H_2O$] in place of the aqueous solution containing 181 g of cobalt nitrate. This catalyst was found to have 3 g of palladium, 5 g of cobalt oxide, 10 g of iron oxide, 10 g of potassium oxide, and 200 g of activated alumina deposited on the carrier per liter of the catalyst.

EXAMPLE 30

A complete catalyst (30) was obtained by following the procedure of Example 29 while using an aqueous solution containing 4.3 mol of sodium nitrate per liter in place of the aqueous solution containing 2.6 mols of potassium nitrate per liter. This catalyst was found to have 3 g of palladium, 5 g of cobalt oxide, 10 g of iron oxide, 10 g of sodium oxide, and 200 g of activated alumina deposited on the carrier per liter of the catalyst.

EXAMPLE 31

A complete catalyst (31) was obtained by following the procedure of Example 29 while using an aqueous solution containing 1.2 mols of rubidium nitrate per liter in place of the aqueous solution containing 2.6 mols of potassium nitrate per liter. This catalyst was found to have 3 g of palladium, 5 g of cobalt oxide, 10 g of iron oxide, 10 g of rubidium oxide, and 200 g of activated alumina deposited on the carrier per liter of the catalyst.

EXAMPLE 32

A complete catalyst (32) was obtained by following the procedure of Example 29 while using 0.8 mol per liter of an aqueous cesium nitrate solution containing in place of the aqueous solution containing 2.6 mols of potassium nitrate per liter. This catalyst was found to have 3 g of palladium, 5 g of cobalt oxide, 10 g of iron oxide, 10 g of cesium oxide, and 200 g of activated alumina deposited on the carrier per liter of the catalyst.

EXAMPLE 33

A complete catalyst (33) was obtained by following the procedure of Example 19 while using an aqueous mixed solution containing 181 g of cobalt nitrate and 506 g of ferric nitrate [$Fe(NO_3)_3 \cdot 9H_2O$] in place of the aqueous solution containing 181 g of cobalt nitrate. This catalyst was found to have 3 g of palladium, 5 g of cobalt oxide, 10 g of potassium oxide, 65 g of zirconia, 10 g of cesium oxide, and 150 g of activated alumina deposited on the carrier per liter of the catalyst.

EXAMPLE 34

A complete catalyst (34) was obtained by following the procedure of Example 24 while using an aqueous mixed solution containing 181 g of cobalt nitrate and 506 g of ferric nitrate [$Fe(NO_3)_3 \cdot 9H_2O$] in place of the aqueous solution containing 181 g of cobalt nitrate. This catalyst was found to have 3 g of palladium, 5 g of cobalt oxide, 10 g of iron oxide, 10 g of potassium oxide, 65 g of zirconia, 10 g of lanthanum oxide, and 150 g of activated alumina deposited on the carrier per liter of the catalyst.

EXAMPLE 35

A complete catalyst (35) was obtained by following the procedure of Example 25 while using an aqueous mixed solution containing 181 g of cobalt nitrate and 506 g of ferric nitrate [$Fe(NO_3)_3.9H_2O$] in place of the aqueous solution containing 181 g of cobalt nitrate. This catalyst was found to have 3 g of palladium, 5 g of cobalt oxide 10 g of iron oxide, 10 g of potassium oxide, 10 g of praseodymium oxide, 65 g zirconia, and 150 g of activated alumina deposited on the carrier per liter of the catalyst.

EXAMPLE 36

A complete catalyst (36) was obtained by following the procedure of Example 1 while using an aqueous solution containing 389 g of nickel nitrate [$Ni(NO_3)_3.6H_2O$] in place of the aqueous solution containing 181 g of cobalt nitrate. This catalyst was found to have 3 g of palladium, 5 g of nickel oxide, 10 g of potassium oxide, and 200 g of activated alumina deposited on the carrier per liter of the catalyst.

(Test 1 for Initial Quality)

The catalysts (1) through (36) prepared in Examples 1 through 36 were each packed in a converter and set in place in a commercially available passenger car equipped with a lean burn engine (displacement 1.5 liters) using gasoline as a fuel thereof. Then, the passenger car was rated for 10.15 Mode by the use of a chassis dynamo device. Relationship between time and speed is shown in FIG. 1. Further, when the speed of automobile is constant A/F was 16 to 23. The results are shown in Tables 1 and 2.

(Test 1 for Quality After Aging)

The catalysts mentioned above were each packed in a converter and tested for 50 hour's durability by feeding the exhaust gas emitting from a commercially available gasoline electron control engine in the process of cruising as mixed with air at an air/fuel (A/F) ratio of 20/1 to the catalyst bed under the conditions of spatial velocity (S.V.) of 120,000/hr and catalyst bed temperature of 600° C. Thereafter, the catalysts were rated for Mode 10.15 in the same manner as in the test 1 for initial quality mentioned above. The results are shown in Tables 3 and 4.

TABLE 1

| | Ratio of purification (%) | | |
|---|---|---|---|
| Catalyst | CO | THC | $NO_x$ |
| 1 | 94 | 90 | 96 |
| 2 | 90 | 84 | 92 |
| 3 | 96 | 92 | 94 |
| 4 | 82 | 74 | 72 |
| 5 | 96 | 92 | 86 |
| 6 | 95 | 92 | 90 |
| 7 | 90 | 80 | 96 |
| 8 | 92 | 92 | 70 |
| 9 | 88 | 68 | 88 |
| 10 | 94 | 92 | 94 |
| 11 | 92 | 88 | 90 |
| 12 | 94 | 88 | 92 |
| 13 | 92 | 80 | 72 |
| 14 | 86 | 74 | 74 |

TABLE 1-continued

| | Ratio of purification (%) | | |
|---|---|---|---|
| Catalyst | CO | THC | $NO_x$ |
| 15 | 92 | 90 | 90 |
| 16 | 94 | 92 | 94 |
| 17 | 90 | 88 | 86 |
| 18 | 94 | 90 | 88 |
| 19 | 94 | 92 | 98 |
| 20 | 94 | 92 | 94 |
| 21 | 94 | 94 | 94 |
| 22 | 92 | 90 | 94 |
| 23 | 92 | 92 | 94 |
| 24 | 94 | 92 | 98 |
| 25 | 94 | 92 | 96 |
| 26 | 90 | 70 | 68 |
| 27 | 96 | 94 | 42 |

TABLE 2

| | Ratio of purification (%) | | |
|---|---|---|---|
| Catalyst | CO | THC | $NO_x$ |
| 28 | 94 | 92 | 98 |
| 29 | 96 | 94 | 98 |
| 30 | 96 | 94 | 98 |
| 31 | 96 | 94 | 98 |
| 32 | 96 | 94 | 98 |
| 33 | 96 | 96 | 98 |
| 34 | 96 | 96 | 98 |
| 35 | 96 | 96 | 98 |
| 36 | 92 | 92 | 94 |

TABLE 3

| | Ratio of purification (%) | | |
|---|---|---|---|
| Catalyst | CO | THC | $NO_x$ |
| 1 | 94 | 92 | 86 |
| 2 | 90 | 84 | 80 |
| 3 | 94 | 94 | 82 |
| 4 | 84 | 74 | 64 |
| 5 | 94 | 92 | 76 |
| 6 | 94 | 92 | 80 |
| 7 | 92 | 84 | 86 |
| 8 | 92 | 90 | 58 |
| 9 | 86 | 72 | 70 |
| 10 | 94 | 92 | 80 |
| 11 | 92 | 88 | 80 |
| 12 | 92 | 86 | 82 |
| 13 | 90 | 82 | 68 |
| 14 | 92 | 84 | 70 |
| 15 | 94 | 90 | 80 |
| 16 | 92 | 84 | 84 |
| 17 | 94 | 92 | 60 |
| 18 | 92 | 82 | 70 |
| 19 | 98 | 96 | 90 |
| 20 | 94 | 92 | 88 |
| 21 | 94 | 94 | 88 |
| 22 | 90 | 90 | 80 |
| 23 | 92 | 92 | 76 |
| 24 | 94 | 92 | 90 |
| 25 | 94 | 92 | 90 |
| 26 | 90 | 82 | 58 |
| 27 | 94 | 90 | 28 |

TABLE 4

| Catalyst | Ratio of purification (%) | | |
| --- | --- | --- | --- |
|  | CO | THC | NO$_x$ |
| 28 | 92 | 92 | 92 |
| 29 | 96 | 96 | 94 |
| 30 | 94 | 94 | 94 |
| 31 | 94 | 94 | 94 |
| 32 | 94 | 94 | 94 |
| 33 | 96 | 96 | 96 |
| 34 | 96 | 96 | 96 |
| 35 | 96 | 94 | 96 |
| 36 | 92 | 92 | 86 |

EXAMPLE 37

A mixed solution of an aqueous dinitrodiammine platinum solution containing 10 g of platinum and an aqueous rhodium nitrate solution containing 2 g of rhodium was added to 1 kg of activated alumina used in Example 1, the mixture thus obtained was dried at 120° C. for 2 hours and calcined at 500° C. for 2 hours. The powder thus obtained and 500 g of cerium oxide and 100 g of lanthanum oxide were subjected to wet pulverization by a ball mill to obtain an aqueous slurry, and a honeycomb carrier used in Example 1 was dipped and then excess slurry was removed by compressed air. Then the carrier was dried at 120° C. for 2 hours to obtain complete catalyst 37. This catalyst was found to have 1 g of platinum, 0.2 g of rhodium, 50 g of cerium oxide, 10 g of lanthanum oxide, and 100 g of activated alumina per liter of the catalyst.

EXAMPLE 38

A complete catalyst (38) was obtained by following the procedure of Example 37 while using an aqueous palladium nitrate solution containing 10 g of palladium in place of the aqueous dinitrodiammine platinum solution. This catalyst was found to have 1 g of palladium, 0.2 g of rhodium, 50 g of cerium oxide, 10 g of lanthanum oxide and 100 g of 5 activated alumina per liter of the catalyst.

EXAMPLE 39

An aqueous dinitrodiammine solution containing 10 g of platinum was added to 1 kg of activated alumina used in Example 1, the mixture thus obtained was dried at 120° C. for 2 hours and calcined at 500° C. for 2 hours. The powder thus obtained and 100 g of lanthanum oxide were subjected to wet pulverization by a ball mill to obtain an aqueous slurry, and the procedure similar to Example 37 was carried out to obtain a complete catalyst (39). This catalyst was found to have 1 g of platinum, 10 g of lanthanum oxide and 100 g of activated alumina per liter of the catalyst.

(Test 2 for Initial Quality)

The catalyst (33) and (37) through (39) prepared in Example 33 and 37 through 39 respectively were each packed in combination with each 1 liter shown in Table 5 in a converter and were tested in the same manner as in the test 1 for initial quality mentioned above. The results are shown in Table 5.

(Test 2 for Quality After Aging)

The combined catalysts packed in the converter and evaluated as in the test 2 for initial quality were tested for the durability in the same manner as in the test 1 for quality after aging mentioned above. Thereafter, the catalysts were rated for Mode 10.15 in the same manner as in the test for initial quality mentioned above. The results are shown in Table 6.

TABLE 5

| Catalyst | | | Ratio of purification (%) | | |
| --- | --- | --- | --- | --- | --- |
| *1 | *2 | *3 | | | |
| Position A | Position B | Position C | CO | THC | NO$_x$ |
| — | 33 | 37 | 98 | 98 | 98 |
| — | 33 | 38 | 98 | 98 | 98 |
| — | 33 | 39 | 98 | 98 | 98 |
| 38 | 33 | 37 | 100 | 100 | 98 |
| 39 | 33 | 37 | 100 | 100 | 98 |

*1Position A is a position of upper stream side of exhaust gas of the catalyst position B.
*2Position B is a position of the catalyst where the test 1 for initial quality.
*3Position C is a position of down stream side of exhaust gas of the catalyst position B.

TABLE 6

| Catalyst | | | Ratio of purification (%) | | |
| --- | --- | --- | --- | --- | --- |
| *1 | *2 | *3 | | | |
| Position A | Position B | Position C | CO | THC | NO$_x$ |
| — | 33 | 37 | 98 | 98 | 96 |
| — | 33 | 38 | 98 | 98 | 96 |
| — | 33 | 39 | 98 | 98 | 96 |
| 38 | 33 | 37 | 100 | 100 | 96 |
| 39 | 33 | 37 | 100 | 100 | 96 |

*1Position A is a position of upper stream side of exhaust gas of the catalyst position B.
*2Position B is a position of the catalyst where the test 1 for initial quality.
*3Position C is a position of down stream side of exhaust gas of the catalyst position B.

What is claimed is:

1. A method for the purification of the exhaust gas from an automobile carrying a lean burn engine using gasoline as a fuel thereof, said lean burn engine being used at an air/fuel (A/F) ratio of not less than 15 at least during travel at a constant rate, which comprises:
    causing said exhaust gas from said automobile to contact a catalyst having deposited on an inert carrier a mixture of a catalytically active component consisting essentially of palladium, an oxide of at least one alkali metal selected from the group consisting of potassium, sodium, rubidium, and cesium, and an oxide of at least one iron family metal selected from the group consisting of cobalt, nickel, and iron with a refractory inorganic oxide and subsequently;
    causing said exhaust gas to contact an oxidizing catalyst or a three-way catalyst.

2. A method according to claim 1, wherein said catalyst has deposited on an inert carrier a mixture of a catalytically active component consisting essentially of palladium, an oxide of at least one alkali metal selected from the group consisting of potassium, rubidium, and cesium, and an oxide of at least one iron family metal selected from the group consisting of cobalt, nickel, and iron with a refractory inorganic oxide and further contains an oxide of at least one metal selected from the group consisting of cerium, lanthanum, and praseodymium.

3. A method according to claim 1, wherein said oxidizing catalyst contains 0.1 to 5 g of platinum, and/or palladium as a precious metal, 10 to 300 g of a refractory inorganic oxide, and more than 0 g to not more than 150 g of a rare earth element oxide per liter of the oxidizing catalyst.

4. A method according to claim 1, wherein said three-way catalyst contains 0.1 to 5 g of at least one precious metal selected from the group consisting of platinum plus rhodium; palladium plus rhodium, platinum, palladium plus rhodium; 10 to 150 g of ceria, 10 to 300 g of a refractory inorganic oxide, and from more than 0 g to not more than 50 g of the oxide of a rare earth element other than cerium per liter of the three-way catalyst.

5. A method according to claim 1, wherein said iron family metal is cobalt plus iron.

6. A method according to claim 1, wherein said exhaust gas from said lean burn engine is discharged with said lean burn engine varied repeatedly between substantially stoichiometric and lean.

7. A method for the purification of the exhaust gas from an automobile carrying a lean burn engine using gasoline as a fuel thereof, said lean burn engine being used at an air/fuel (A/F) ratio of not less than 15 at least during travel at a constant rate, which comprises:

causing said exhaust gas from said automobile to contact a three-way catalyst or an oxidizing catalyst, subsequently;

causing said exhaust gas to contact a catalyst having deposited on an inert carrier a mixture of a catalytically active component consisting essentially of a palladium, an oxide of at least one alkali metal selected from the group consisting of potassium, sodium, rubidium, and cesium, and an oxide of at least one iron family metal selected from the group consisting of cobalt, nickel, and iron with a refractory inorganic oxide, and further;

causing the exhaust gas to contact a three-way catalyst or an oxidizing catalyst.

8. A method according to claim 7, wherein said catalyst has deposited on an inert carrier a mixture of a catalytically active component consisting essentially of palladium, an oxide of at least one alkali metal selected from the group consisting of potassium, rubidium, and cesium, and an oxide of at least one iron family metal selected from the group consisting of cobalt, nickel, and iron with a refractory inorganic oxide and further contains an oxide of at least one metal selected from the group consisting of cerium, lanthanum, and praseodymium.

9. A method according to claim 7, wherein said oxidizing catalyst contains 0.1 to 5 g of platinum, and/or palladium as a precious metal, 10 to 300 g of a refractory inorganic oxide, and more than 0 g to not more than 150 g of a rare earth element oxide per liter of the oxidizing catalyst.

10. A method according to claim 7, wherein said three-way catalyst contains 0.1 to 5 g of at least one precious metal selected from the group consisting of platinum plus rhodium, palladium plus rhodium, platinum, palladium plus rhodium, 10 to 150 g of ceria, 10 to 300 g of a refractory inorganic oxide, and from more than 0 g to not more than 50 g of the oxide of a rare earth element other than cerium per liter of the three-way catalyst.

11. A method according to claim 7, wherein said iron family metal is cobalt plus iron.

12. A method according to claim 7, wherein said exhaust gas from said lean burn engine is discharged with said lean burn engine varied repeatedly between substantially stoichiometric and lean.

* * * * *